United States Patent
Balle et al.

(10) Patent No.: US 7,469,268 B2
(45) Date of Patent: Dec. 23, 2008

(54) MANAGING DATA RECEIVED FROM PROCESSES OF A DISTRIBUTED COMPUTING ARRANGEMENT

(75) Inventors: Susanne M. Balle, Hudson, NH (US); David C. P. LaFrance-Linden, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 927 days.

(21) Appl. No.: 10/910,679

(22) Filed: Aug. 3, 2004

(65) Prior Publication Data

US 2006/0031848 A1 Feb. 9, 2006

(51) Int. Cl.
*G06F 15/16* (2006.01)
*G06F 15/173* (2006.01)
(52) U.S. Cl. .................. 709/202; 709/223; 709/252
(58) Field of Classification Search ............... 709/202, 709/201, 223, 224, 252
See application file for complete search history.

(56) References Cited

U.S. PATENT DOCUMENTS

| 6,813,634 | B1 * | 11/2004 | Ahmed ................... 709/224 |
| 6,993,587 | B1 * | 1/2006 | Basani et al. ............ 709/229 |
| 7,287,075 | B2 * | 10/2007 | Srivastava et al. ........ 709/224 |
| 2003/0070087 | A1 * | 4/2003 | Gryaznov ................ 713/201 |
| 2004/0243702 | A1 * | 12/2004 | Vainio et al. ............ 709/224 |
| 2005/0256935 | A1 * | 11/2005 | Overstreet et al. ........ 709/208 |

\* cited by examiner

*Primary Examiner*—William C Vaughn, Jr.
*Assistant Examiner*—Kristie D Shingles (57) ABSTRACT

Data is received from a plurality of processes of a distributed computing arrangement. The computing arrangement contains a plurality of processing nodes. In a first processing node of the plurality of processing nodes data objects are received from a subset of the plurality of processes. A set of non-responsive processes of the plurality of processes is determined based on arrival times of the data objects relative to a current time. The data objects are aggregated into a set of data objects without waiting for data objects associated with the non-responsive processes. The set of data objects are sent to a second processing node of the plurality of processing nodes.

15 Claims, 8 Drawing Sheets

| | NRPS | Have | Expected | Event | Comment |
|---|---|---|---|---|---|
| 802 | | | | Receive L1[10:59] | L1 expected from [10:99] |
| 804 | [ ] | L1[10:59] | L1[60:99] | | |
| 806 | | | | Receive L2[10:59] | L2 expected from [10:99] |
| 808 | [ ] | L1[10:59] L2[10:59] | L1[60:99] L2[60:99] | | |
| 810 | | | | L1 and L2 timeout | |
| 812 | [60:99] | L1[ ] L2[ ] | L1[60:99] L2[60:99] | | L1[10:59] & L2[10:59] sent rootward w/ TimedOut [60:99] |
| 814 | | | | Receive L1[60:69], | |
| 816 | [70:99] | L1[60:69] L2[ ] | L1[70:99] L2[60:99] | | |
| 818 | | | | Receive L1[70:79], L2[60:69] | |
| 820 | [80:99] | L1[60:79] L2[60:69] | L1[80:99] L2[70:99] | | |
| 822 | | | | L1 times out | |
| 824 | [80:99] | L1[ ] L2[60:69] | L1[80:99 ] L2[70:99] | | L1[60:79] sent rootward w/ TimedOut[80:99] |
| 826 | | | | Receive L2[70:79] | |
| 828 | [80:99] | L1[ ] L2[ ] | L1[80:99] L2[80:99] | | L2[60:69] is sent rootward w/ TimedOut[80:99] |
| 830 | | | | Receive L3[10:15] | L3 expected from [10:15, 60:65] |

| | NRPS | Have | Expected | Event | Comment |
|---|---|---|---|---|---|
| 832 — | [80:99] | L1[ ]<br>L2[ ]<br>L3[10:15] | L1[80:99 ]<br>L2[80:99]<br>L3[60:65] | | |
| 834 — | | | | L3 times out | |
| 836 — | [60:65] | L1[ ]<br>L2[ ]<br>L3[ ] | L1[80:99]<br>L2[80:99]<br>L3[60:65] | | L3[10:15] sent rootward w/<br>TimedOut[60:65] |
| 838 — | | | | Receive<br>L3[60:65] | |
| 840 — | [ ] | L1[ ]<br>L2[ ]<br>L3[ ] | L1[80:99]<br>L2[80:99]<br>L3[ ] | | L3[60:65] sent rootward<br>since set is complete w/<br>TimedOut[] |

TIME

*FIG. 8B*

MANAGING DATA RECEIVED FROM PROCESSES OF A DISTRIBUTED COMPUTING ARRANGEMENT

FIELD OF THE INVENTION

The present disclosure relates to distributed computing, and more particularly to processing data received from processes of a distributed computing arrangement.

BACKGROUND

High-performance computing refers to the systems used to solve large and complex computational problems. These complex problems arise in applications such as nuclear weapons research and creating high-resolution weather models. Typically, high-performance computing requires specialized, high-performance hardware, such as supercomputers, that drive massively paralleled central processing units (CPUs). For many years, supercomputers have been the predominant hardware used to run massive calculations.

Although effective, supercomputers are expensive and require specialized skills to set up and operate. In order for an organization to make use of supercomputers, significant hardware investments are required, as well as hiring specialized programmers and administrators. However, recent advances in technology have provided alternate means of performing high-performance computing that is far less expensive than traditional supercomputers.

One of the new approaches to high-performance computing involves the use of clusters. Clusters are simply standalone computers that are networked together into a massively paralleled processor (MPP) systems. Each computer runs independently and solves part of a distributed computation. The availability of cheap but powerful personal computers combined with fast networking technologies has made clustering as effective as supercomputers in solving large computational problems, but at a far cheaper price. The availability of open and freely modifiable operating systems such as Linux™ have allowed clustering to be more easily implemented by the average organization. Although clustering has been instrumental in providing inexpensive MPP, the management of clustered systems is not trivial. Administering hundreds of independently running computers poses many challenges, including physical aspects (heat removal, access for maintenance, etc.) and system administration tasks (setting up machines, checking status, etc). A variety of approaches for addressing these and related issues may therefore be desirable.

SUMMARY

Data is received from a plurality of processes of a distributed computing arrangement. The computing arrangement contains a plurality of processing nodes. In a first processing node of the plurality of processing nodes data objects are received from a subset of the plurality of processes. A set of non-responsive processes of the plurality of processes is determined based on arrival times of the data objects relative to a current time. The data objects are aggregated into a set of data objects without waiting for data objects associated with the non-responsive processes. The set of data objects are sent to a second processing node of the plurality of processing nodes.

DETAILED DESCRIPTION

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

In general, the present disclosure relates to receiving text from a plurality of processes. The text may be in any order, and there may be significant redundancy between the outputs of different processes. Therefore, the text may be more efficiently processed by combining the redundant data. The combined output is much more useful for display and/or other processing than is the raw data.

A system administrator of a typical corporate network will usually monitor a select group of critical systems real-time. These systems may include file servers, mail servers, databases, and network switching elements. This monitoring may occur under special conditions (e.g., troubleshooting a problem) or as part of routine checks on system health. The administration of massively paralleled systems is drastically different, however. Instead of monitoring a few, high importance systems, the administrator must monitor the entire system as a whole. Even though one feature of massively paralleled systems is that they are tolerant of failures of individual nodes, there are still times when the administrator must try to simultaneously monitor the activity of hundreds or thousands of nodes.

When debugging a large number of processes, a user would be overwhelmed if the output from each of the debuggers were just sent down to a command line interface. Not only would the amount of text be enormous, but the output could become jumbled if text from one process is interspersed with the text from another process. Therefore, it would be advantageous to have a way of aggregating redundant data before it is presented to a user.

In order to aggregate redundant data, the system would have to wait for all expected data in order to group it for display. However, if the system has to wait for each and every process to complete a line of output before displaying that output, then the display may suffer long delays because of processes that are slow or non-responsive. Therefore, a system that aggregates data must deal with non-responsive processes in order to maintain acceptable performance.

Figure 1:
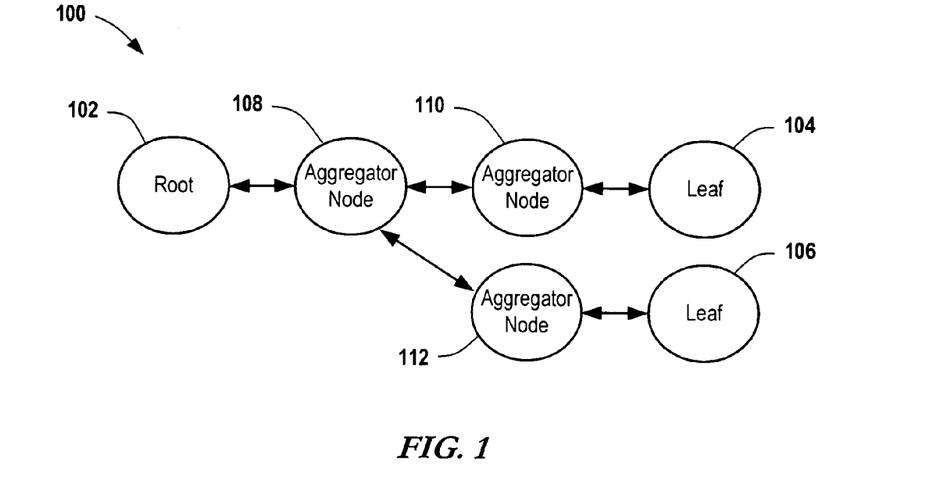
FIG. 1 illustrates a multi-node distributed processing arrangement according to embodiments of the present invention.

The present disclosure relates to a system for managing potentially redundant data that is received simultaneously from multiple sources, while dealing with some of those sources that may be unresponsive. In order to facilitate an understanding of these aspects of the invention may be described in the context of a distributed data processing system that sends debug data for display via a multi-node arrangement. FIG. 1 shows an aggregator arrangement 100 according to embodiments of the present invention. In general, end-to-end communications in the aggregator arrangement occur between a root node 102 and one or more leaf nodes 104, 106. In between the root node 102 and leaf nodes 104, 106 are aggregator nodes 108, 110, 112. An aggregator node 108, 110, 112 is generally any node that performs processing between a root 102 and leaf nodes 108, 110, 112. Aggregator nodes 108, 110, 112 may be arranged serially, such that the output of one aggregator node 110 goes to the input of another aggregator node 108.

In a parallel processing application, the root node 102 is generally a computer used to control and/or monitor a massively paralleled computing arrangement. The leaf nodes 104, 106 are typically data processing elements that perform discrete portions of a distributed processing task. The data processing elements may be any combination of separate computers and separate processes running on a single computer. For purposes of this disclosure, each leaf node 104, 106 may be assumed to correspond to a single process. Thus, a single computer may include one or more leaf nodes 104, 106, each associated with a unique process id.

One task that may be performed at the root node 102 is receiving text, such as debug output, from a plurality of leaf nodes 104, 106 for display to a user. Therefore, one or more aggregator nodes 108, 110, 112 may be used to aggregate redundant debug output from leaf nodes 104, 106. The aggregator nodes 108, 110, 112 can be dispersed throughout the arrangement 100 to reduce workload and reduce traffic system-wide.

Figure 2:
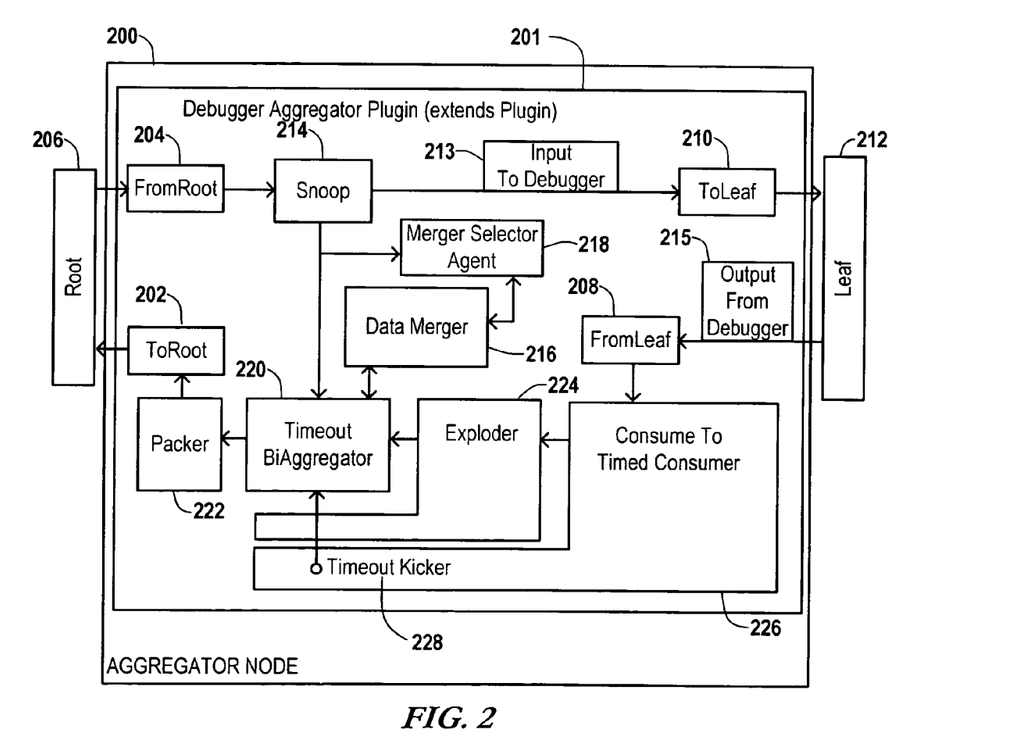
FIG. 2 illustrates a data aggregation node according to embodiments of the present invention.

FIG. 2 shows an example of an aggregator node 200 for providing debug data aggregation according to embodiments of the present invention. The aggregator node 200 may include a combination of modules, known as "plug-ins," that are used to process root-ward and leaf-ward data. In particular, the aggregator node includes an aggregator plug-in 201 that is designed to reduce the amount of data sent down a node-tree by aggregating outputs at each level in the tree.

The aggregator node 200 inherits its characteristics from a generalized plug-in node. This means that the aggregator plug-in 201 implements certain methods required by all plug-in nodes. These methods include to-root 202 and from-root 204 methods used to transfer objects between the aggregator node 200 and a root-ward node 206. The plug-in methods also include to-leaf 208, and from-leaf 210 methods to transfer objects between the aggregator node 200 and a leaf-ward node 212.

The aggregator plug-in 201 includes a snoop component 214 for determining data contained in leaf-ward objects. These leaf-ward objects may be generalized as input-to-debugger objects 213. The input-to-debugger objects 213 may contain data related to the functioning of the aggregator plug-in 201 and identifiers (e.g., process groups) from which debug output is expected or desired. The input-to-debugger objects 213 may also contain policy settings, such as timeout and merging policies. The snoop component 214 discovers this data and distributes it to the appropriate components within the aggregator plug-in 201.

The aggregator plug-in may be used for many tasks that require grouping of similar data objects. One such function of an aggregator plug-in 201 is to merge root-ward data. This root-ward data may be generalized as an output-from-debugger object 215. The output-from debugger object 215 may contain data such as lines of debug text. Since it is assumed that the distributed system is performing a distributed task in parallel, output-from debugger objects 215 from different processes may include redundant data. Therefore, it saves greatly on processing and network bandwidth to merge data contained in related output-from-debugger objects 215. Also, the flow of output-from-debugger objects 215 could be overwhelming to the user if not aggregated.

When debuggers operate in lock-step, the user expects their respective outputs to be identical or very close to identical. When a user examines the result of printing scalar variables (e.g. the Unified Parallel C or Message Passing Interface process identification variables) or more complex outputs (e.g. portions of a stack trace), the user often realizes that the outputs consist of (textually) identical or similar outputs.

Various types of collecting activities may be accomplished within the aggregator plug-in 201. In this example, the aggregator plug-in 201 handles with merging using a merger component 216. The merger component 216 may be performed independently of the data flow, bookkeeping, timeout mechanisms, and other functionality of the aggregator plug-in 201. A more detailed description of merging aggregated output is described in commonly owned U.S. Patent Application entitled, "Multiprocess Debugging Using Multiple Conventional Debuggers" by Balle et al., filed on Mar. 28, 2002, and having patent application Ser. No. 10/109,287, the contents of which are incorporated herein by reference.

It will be appreciated that the data from the plurality of nodes may have more compact and/or useful representations than simply maintaining the original plurality of data. For the purposes of this disclosure, it may be assumed the data has been aggregated into a single object. The object may or may not be able to recover the original plurality of data. Although various aspects of the aggregator nodes are described in terms of merging, it will be appreciated that the aggregator nodes may be used for other functions besides merging.

A timeout mechanism is included as part of the aggregation mechanism to prevent output from stalling within an aggregator node 200 if a debugger is slower than its siblings. Timeout mechanisms typically utilize timeout values to compare against arrival times of output-from-debugger objects 215. These timeout values specify the maximum time the aggregation mechanism will hold on to incomplete output-from-debugger sets 215 before sending the sets root-ward. Incomplete output-from-debugger sets 215 means that the aggregator node has not received output-from-debugger objects with a given key from all of the processes it expected to receive output from. The timeout values may be set to default values, and the user may able to overwrite the default values.

Aggregation algorithms utilized by the aggregator plug-in 201 should be configured to handle most expected and common output from a debugger. The aggregation algorithms used to condense the outputs should to be efficient as well as providing easy to view output. Generally speaking, an efficient algorithm is one which is fast, has reasonable memory requirements, and is able to aggregate the most common debugger outputs, as well as have behaviors which acceptable to the user. For example if a debugger of one node is slower than its siblings, the user shouldn't have to wait until all the outputs have been received before seeing some output on the screen. After a certain time, the user should see some partial aggregation followed by the remaining output from the aggregation when all outputs have been received.

It will be appreciated that leaf nodes will have varying response times when providing debug output to the aggregator node 200. These variances may be due to network congestion, processor usage, system faults, etc. To account for these timing differences, the aggregator plug-ins 200 within the aggregator nodes 200 utilize a delay before sending down a partial aggregated result. This delay should be set to a reasonable default value, as well as being modifiable by the user. In one configuration, an adaptive delay may be used. The adaptive delay automatically gets longer if the time interval between outputs from different processes for a given output increases. Likewise, the adaptive delay will shorten if time interval between outputs decreases. The adaptive delay would typically lie within a range defined by a reasonable default range and/or a user specified range.

Various aspects of data aggregation, including bookkeeping and timeout algorithms, are performed in a timeout bi-aggregator 220. The timeout bi-aggregator 220 utilizes timeout algorithms that are used to make decisions regarding whether to hold data for further aggregation or to send the data onward to the merger component 216 and/or the to-root method 202. Timeouts are mediated by a consume-to-timed-consumer component 226. The consume-to-timed-consumer component 226 includes a timeout kicker component 228 for determining timeout events and communicating those events to the timeout bi-aggregator 220.

The exploder 222 and packer 224 components are transformers; their function is to transform one transfer paradigm to another. The exploder component 222 consumes time-stamped objects from the consume-to-timed-consumer component 226, explodes debugger output into its components, and delivers these components to the timeout bi-aggregator 220. On the root-ward side, the packer component 224 packs components into an output-from-debugger format for transmission to the root.

Figure 3:
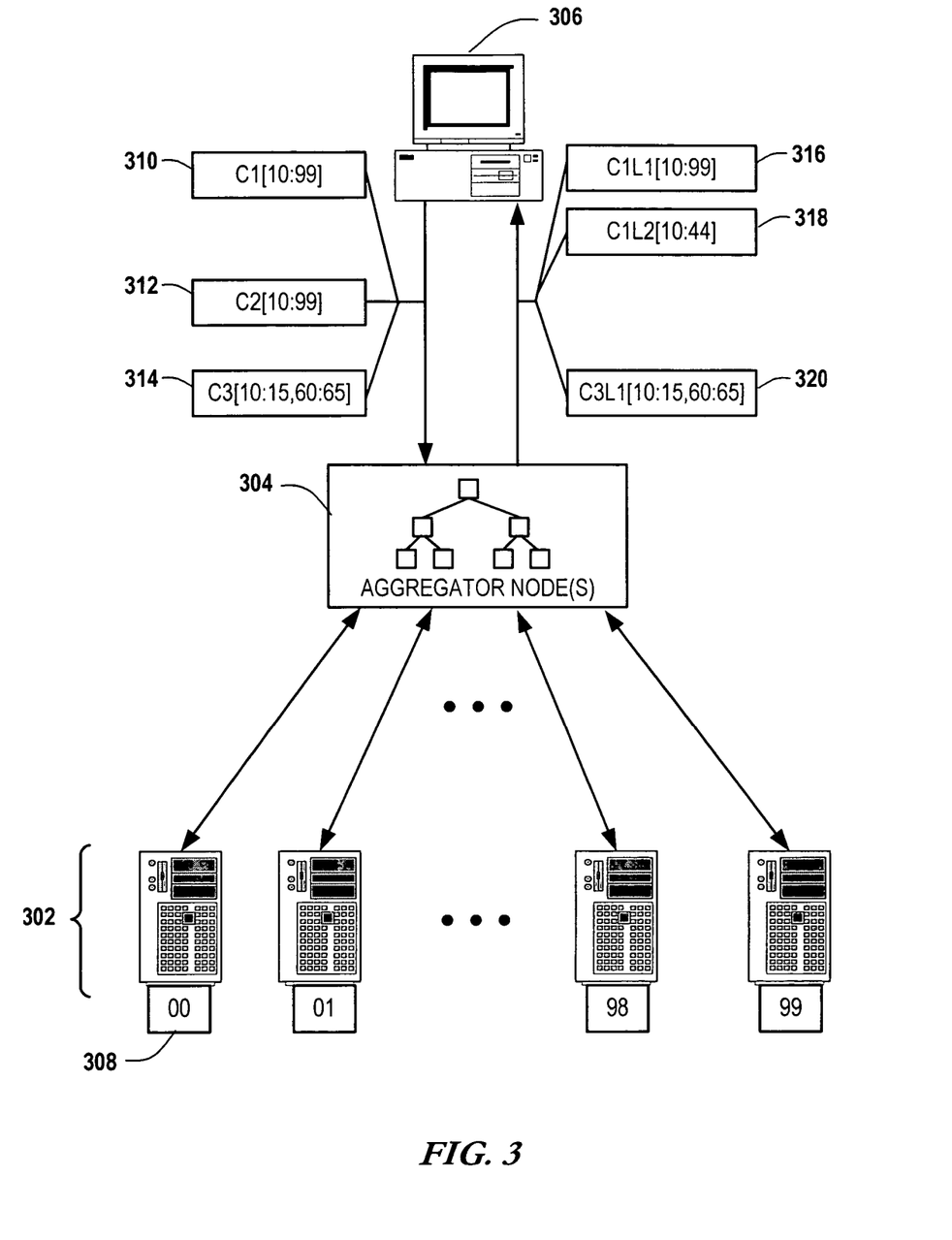
FIG. 3 illustrates an aggregator node incorporated in a distributed processing arrangement according to embodiments of the present invention.

In reference now to FIG. 3, an aggregator node arrangement is illustrated in a distributed system according to embodiments of the present invention. A plurality of leaf nodes 302 are coupled to one or more aggregator nodes 304. The aggregator nodes 304 send aggregated objects to a root node 306 for purposes such as debugging.

The leaf nodes can each be represented by a process id (e.g., id 308). Thus, the illustrated system has a total of 100 processes with ids 00-99. System events (e.g., commands) and objects may be associated with a subset of the leaf nodes 302. The subset of nodes are referred to herein as process sets. The notation used for a process set is [m:n], where the set includes processes identifiers m through n inclusive. A process set might also be represented by [m:n,o:p], which includes processes identifiers m through n inclusive and o through p inclusive.

A process set may be associated with a particular event or set of objects. This is annotated by prefixing the process set with an identifier. In FIG. 2, for example, three commands 310, 312 and 314 are sent to processes [10:99], [10:99] and [10:15, 60:65], respectively. The prefixes C1, C2, and C2 are identifiers associated with the commands 310, 312 and 314. In response, three aggregated output objects 316, 318, 320 are sent to the root node 306 after processing at the aggregator nodes 304. Note that the Cn prefixes used in the output objects 316, 318, 320 indicate the command that is associated with the object. Thus the aggregated output objects 316 and 318 are both associated with command C1 (310), and aggregated output object 320 is associated with command C3 (314). In this example, there was no response to command C2 (312). The Ln prefixes indicate a particular line of output received in response to the command.

In general, zero or more output objects may be received at the root node 306 in response to any command. Also, the number of output objects received in response to any given command may vary among the targeted leaf nodes 302. For example, the output in response to command C1 (310) includes two lines (316, 318) for process id 10 through 44 whereas the response to C1 (310) from process ids 45 through 99 only include a single line (316).

The objects used to form the aggregated outputs 316, 318, 320 may be sent in response to one or more system events. The system event may be a message, system command, time-based event, operator command, hardware trigger, etc. When the targeted leaf nodes 302 respond to the same event, it is to be expected that these responses will be similar, and thus candidates for aggregation. However, it is typically assumed that a response due to event 1 will be different from the response from event 2 where events 1 and 2 are independent, and thus the responses would not be aggregated. So, for example, where a user sends two disjoint commands to a set of leaf nodes 302, it is expected that outputs resulting from the first command can be managed independently of outputs from the second command.

When a new set of leaf nodes 302 is activated due to a triggering event, the aggregator node 304 becomes aware of the new updated set and therefore only involves this set in the aggregation of output for that event. The associations with system commands/events may be used as keys to reference any object passing through the aggregator. In the illustrated example, the keys for aggregated objects 316, 318, and 320 are C1L1, C1L2, and C3L3, respectively.

The timeout policy of the aggregator nodes 304 is on a per-key basis. On the root-ward path, the aggregator node 304 receives debugger objects corresponding to a specific key. Once a timeout has occurred for an object associated with a given key, all objects with that key are sent root-ward, even if the set is incomplete. It will be appreciated that objects should not be sent root-ward out of order. If for some reason an object which is not ready to be sent root-ward blocks an object which has timed out, the latter will not be sent, since this would result in sending objects out of order. One solution to this involves sending the blocking object root-ward by first de-merging the content of the blocking object and only sending a partial aggregated object root-ward followed by the timed out object.

Figure 4:
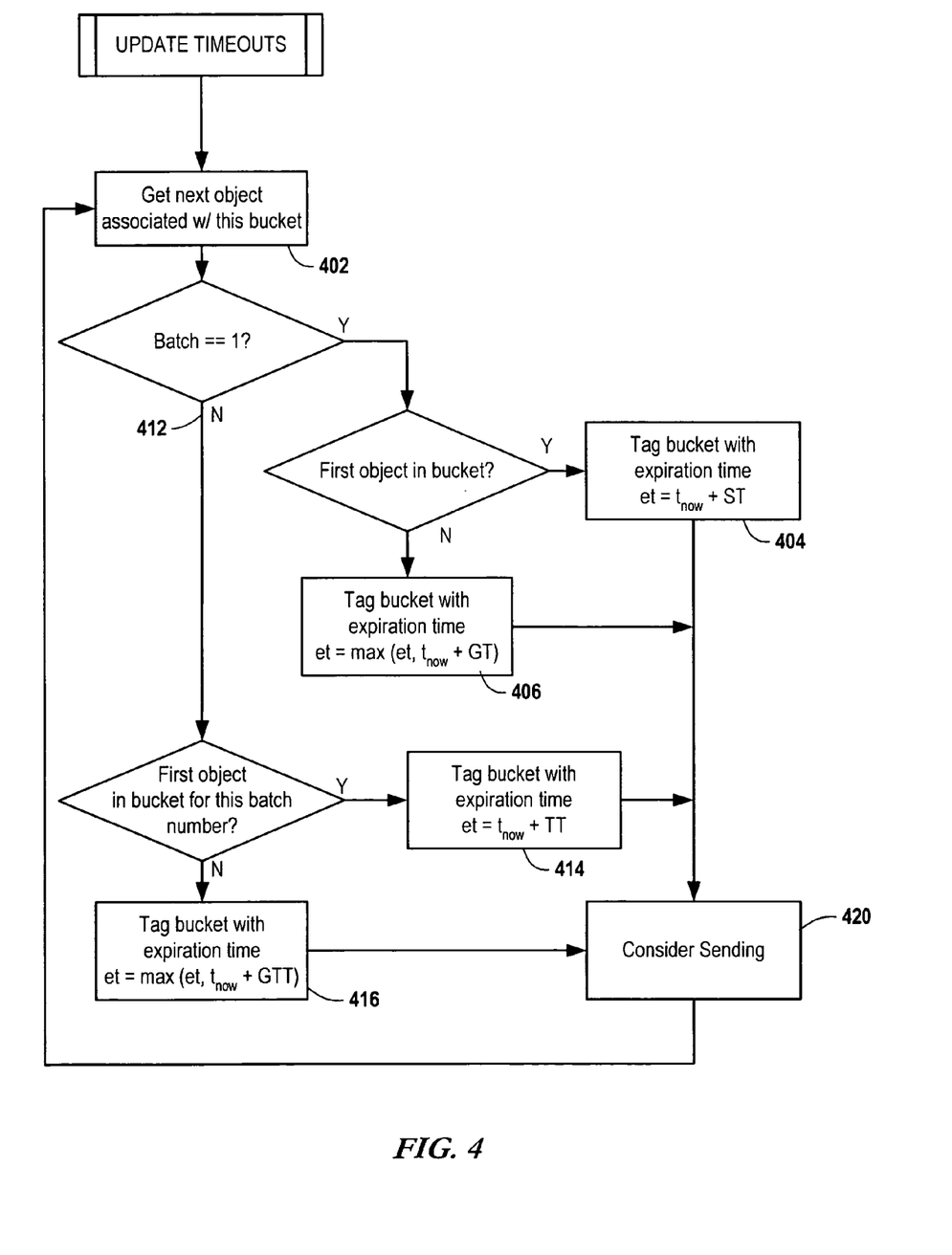
FIG. 4 illustrates a timeout algorithm of an aggregator node according to embodiments of the present invention.

Generally, timeouts are set in response to an incomplete set of arriving objects (complete objects that are not otherwise blocked can be sent onward immediately). Without any further object arrivals, the timeout will fire, and incomplete objects are sent root-ward. The timeouts for an aggregator node may be determined as shown in FIG. 4. For purposes of discussion, the following terms are defined: bucket—defines the set of expected object for a specific key for the current active process set; batch=1—defines the objects for a specific bucket received by the aggregator node before the any timeouts are triggered; batch>1—defines the objects for a specific bucket received by the aggregator node after the a timeout has been triggered.

The algorithm shown in FIG. 4 uses the variables ST, GT, TT, and GTT, which are time values utilized by the aggregator node to determine timeouts in various states. Typically, a timer will be set based on one of the expiration times (et) calculated with ST, GT, TT, and GTT according to FIG. 4.

The ST variable represents an initial delay setting, and may be set to a reasonable turnaround time between an event and its response for a given system. On arrival (402) the first object in a bucket is tagged with an expiration time et=$t_{now}$+ ST (404). If no timeout occurs, the remaining objects (which are still part of batch #1) arrive (402) and are tagged with the expiration time: et=max(et, $t_{now}$+GT) (406). When the timeout is close to being triggered, the GT variable has the effect of extending (406) the expiration time to account for bursts of latecoming data. However, GT is set to a much smaller value than ST because the latecoming events should not delay the aggregator any longer than necessary. Therefore, the use of GT will capture additional bursts of data that arrive just before the first batch was ready to be dispatched, without significantly delaying that dispatch.

If a timeout occurs, an incomplete output-from-debugger set is sent root-ward and the batch number is incremented. When batch>1 (412) the next object to arrive is tagged with the expiration time: et=$t_{now}$+TT (414). TT is smaller than ST because it is inefficient to wait a long time for objects that have already timed out of previous batches. In all likelihood, those delayed objects will be received much later or not at all, therefore there is no point in delaying subsequently received batches based on a slight chance of further aggregation. When batch>1 and the first object has been received, subsequently arriving objects are tagged with the expiration time: et=max (et, $t_{now}$+GTT) (416). The GTT variable is smaller than the TT variable for reasons described for GT and ST above.

If additional timeouts occurs for a specific bucket the batch number get incremented and the process repeats. After each timeout update, the algorithm will consider sending (420), which is described more fully below in relation to FIG. 6. If, at any time, the complete set of expected objects is received, the remaining objects may be sent root-ward and the timing algorithm is done. In general, the following relationships are assumed regarding the timeout variables: ST>>>GT; ST>>TT; TT>>>GTT. The variables may be originally set to default values, although the user may wish to change these values. Table 1 summarizes these expiration time policies:

TABLE 1

|  | Time of arrival = 1 | Time of arrival > 1 |
| --- | --- | --- |
| Batch = 1 | et = $t_{now}$ + ST | et = max(et, $t_{now}$ + GT) |
| Batch > 1 | et = $t_{now}$ + TT | et = max (et, $t_{now}$ + GTT) | where:
ST >>> GT; ST >> TT; TT >>> GTT

One motivation behind using a timeout algorithm as shown in FIG. 4 is that the user doesn't want to wait for output from slow debuggers. The algorithm ensures that no output is stalled in the aggregator node forever. However, there will still be a delay involved when nodes are non-responsive, since the timeout mechanisms wait a predetermined amount of time before sending incomplete objects root-ward. When there is only one aggregator node between the leaf and root, this delay is negligible. However, where there are multiple levels of aggregator nodes, the output will have to endure the same delay at each aggregator node before arriving at the root node. Therefore, in a multi-level aggregator arrangement, the timeout mechanisms tend to cause cumulative delays when nodes are non-responsive.

For example, assume it takes two seconds for the output to timeout at each level of a four-level, multi-node arrangement. The user in this scenario will have to wait eight seconds before seeing any output if only one responding output is stalled. However, if the unresponsive process sets are recorded and passed root-ward along with the objects, then the root-ward nodes can decide not to wait for unresponsive process sets. Applying this technique to the previous example, the user would see the output a little after two seconds.

One way of informing root-ward nodes about unresponsive processes is by the use of process sets. As previously described, a process set is a collection of processes tracked by an aggregator node. The notation used herein for a process set is [m:n], where the set includes processes identifiers m through n inclusive. An aggregator node will keep track of at least four process sets, referred to herein as a non-responsive process set (NRPS), the "timed-out" process set, the "have" process set, and the "expected" process set. The NRPS is a global variable maintained by the aggregator node to keep track of currently known non-responsive processes. The timed-out process set is used to represent a set of non-responsive processes that are communicated root-ward. The "have" process set references debug objects already received due to a system event. The "expected" process set references debug objects expected due to a system event, but not yet received.

The NRPS is used to keep track of non-responsive processes regardless of the events that have triggered output from those processes. For purposes of aggregation, "timed-out," "have," and "expected" process sets are associated with the event that triggered the output. Process sets that are associated with an event identifier may be represented herein as Lx[m:n], where Lx represents the event that triggers a particular set of related outputs. For example, process sets C1L1[1:10] and C2L1[1:10] both affect processes 1 through 10, but are in response to different events (e.g., lines C1L1 and C2L1 of debug output).

The aggregator node maintains a "have" and "expected" process set for each event of interest. These events may be detected by a snoop component 214 (see FIG. 2). The aggregator node also keeps an instance of an NRPS for tracking all known non-responsive processes. The aggregator node will instantiate a "timed-out" process set when it in necessary to communicate timed-out processes to other aggregator nodes.

Figure 5:
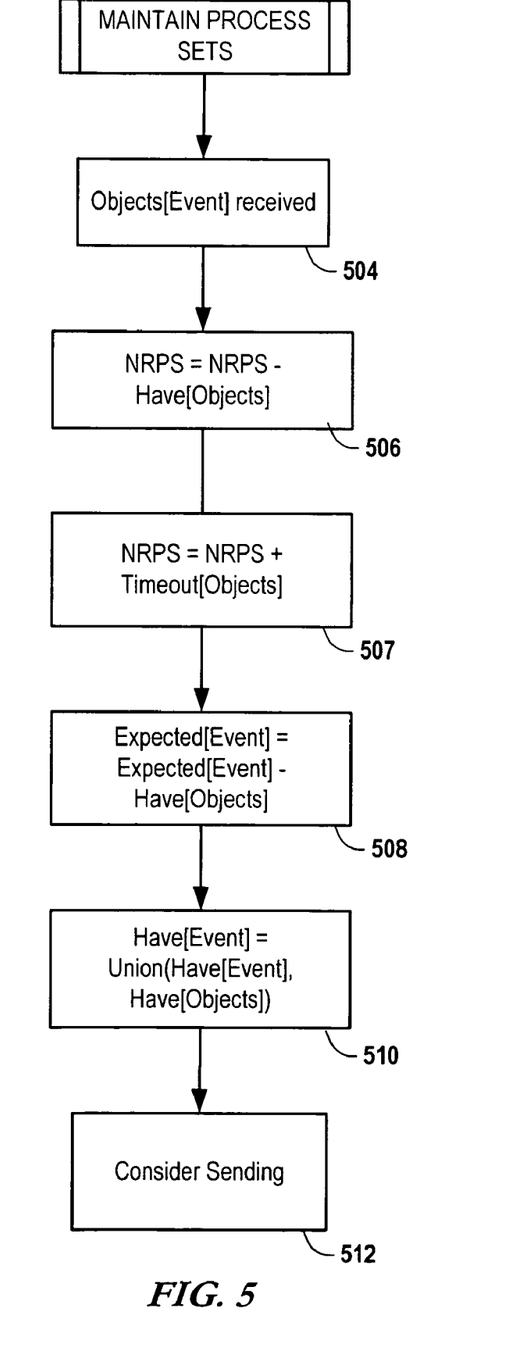
FIG. 5 illustrates a procedure for maintaining various process sets of a timeout tracker according to embodiments of the present invention.

FIG. 5 shows how an aggregator node may maintain the various process sets according to embodiments of the present invention. The procedure begins when a set of one or more objects are received (504). For this example, it is assumed the objects are debug objects, although the procedure may be applicable to any distributed computing data that can be aggregated. It is also assumed that the aggregator node utilizing this procedure has had notice (via mechanisms such as a snoop component 214 in FIG. 2) of expected debug objects due to a command or system event. The received debug objects are associated with this event, as are the "have" and "expected" process sets.

When objects are received (504), the objects are removed (506) from the NRPS, because receipt of the objects means that the associated processes are no longer non-responsive. Any timed-out objects are used to update the NRPS (507). The received objects are used to update (508) the expected process set, which involves removing the objects from the "expected" process set. Similarly, the objects are added (510) to the "have" process set. Thereafter, the algorithm will consider sending (512), which is described more fully below in relation to FIG. 6.

Figure 6:
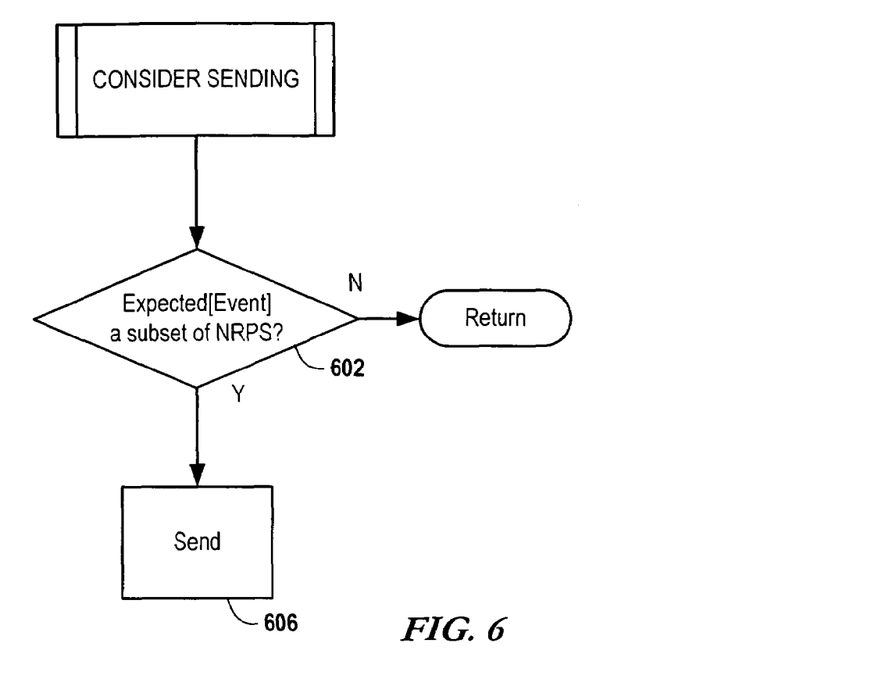
FIG. 6 illustrates a procedure for considering whether to send process sets according to embodiments of the present invention.

FIG. 6 shows a process for evaluating whether to sending objects as they are received. Typically, an object is not sent root-ward (606) until a timeout condition occurs or the object is complete. However, if the "expected" process set is a subset of NRPS (602), an incomplete object may be sent root-ward (606).

The reason that the incomplete object is sent root-ward (606) without a timeout or completion condition has to do with prior history. The conditions reflected by operations is likely to occur when other events have already determined (as reflected in the NRPS) that some processes are not responding. If the aggregator already has indication that the set of processes in NRPS are not likely to respond for one event, it is also likely that these processes will not respond for other events. In other words, the NRPS should be used not only to inform root-ward nodes of non-responsive processes, but as used as a local indicator of non-responsiveness. Therefore, later events need not wait for timeouts due to unresponsive nodes.

Figure 7A:
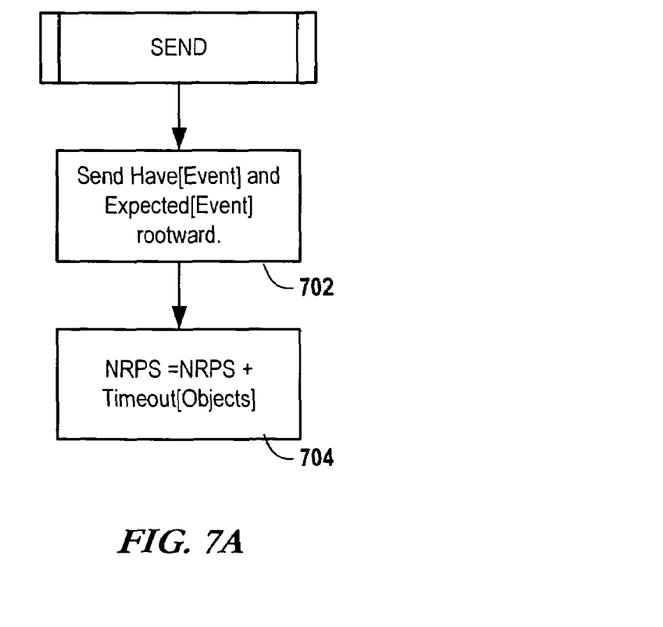
FIG. 7A illustrates a procedure for sending process sets according to embodiments of the present invention.

FIG. 7A shows the process of sending objects root-ward according to embodiments of the present invention. The "have" process set and "expected" set are sent root-ward (702). The "have" process set represents the current aggregation of objects for this event. Therefore, sending the "have" process set root-ward (702) indicates that sufficient aggregation has occurred for this event given the timing constraints. Sending the "expected" set informs root-ward nodes of non-responsive processes for this event. After the process sets are sent (702), the NRPS is updated (704) with the timed-out processes.

Figure 7B:
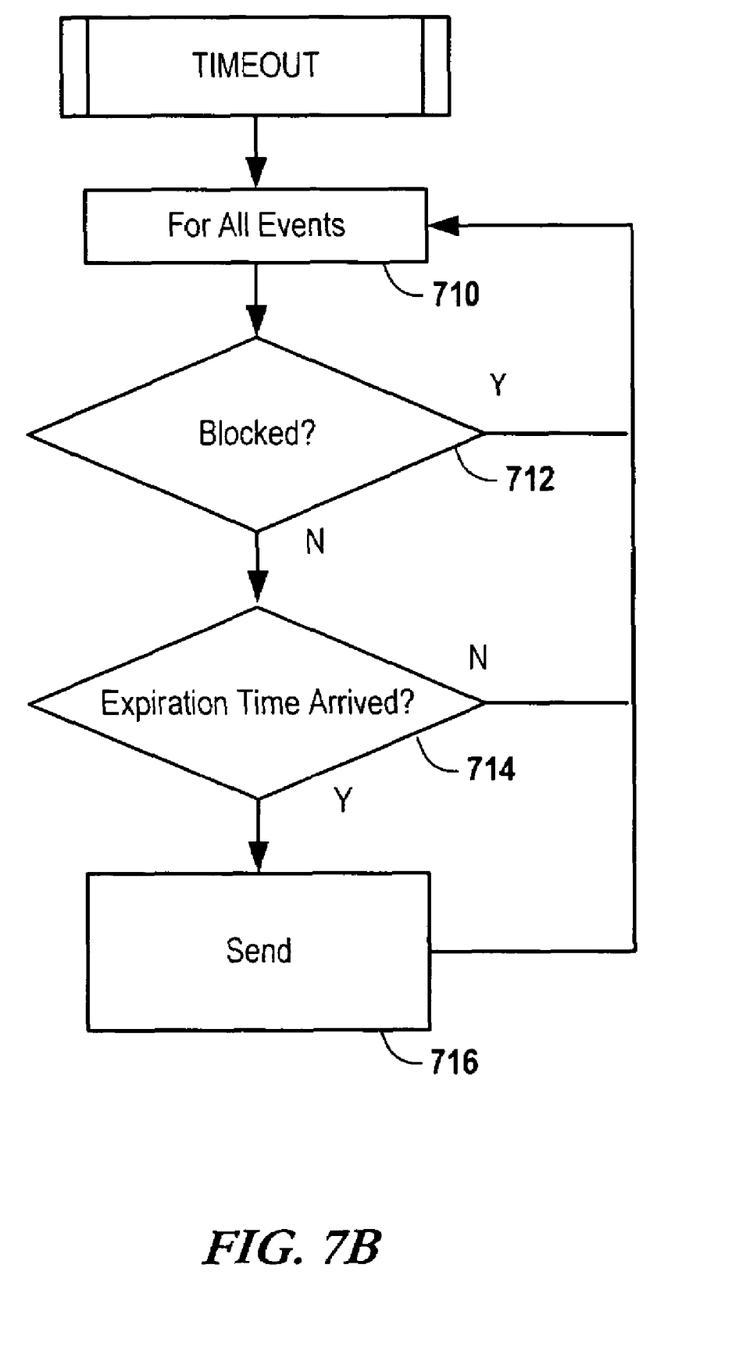
FIG. 7B illustrates a procedure for sending process sets according to embodiments of the present invention.

FIG. 7B shows the process of determining timeouts according to embodiments of the present invention. For all events (710), it is determined if objects associated with the event are blocked (712). This may occur when objects from a prior event have not yet been sent out. If not blocked, the expiration times for the event are checked (714). If an expiration time has arrived, the objects associated with this event are sent (716).

Figure 8A:
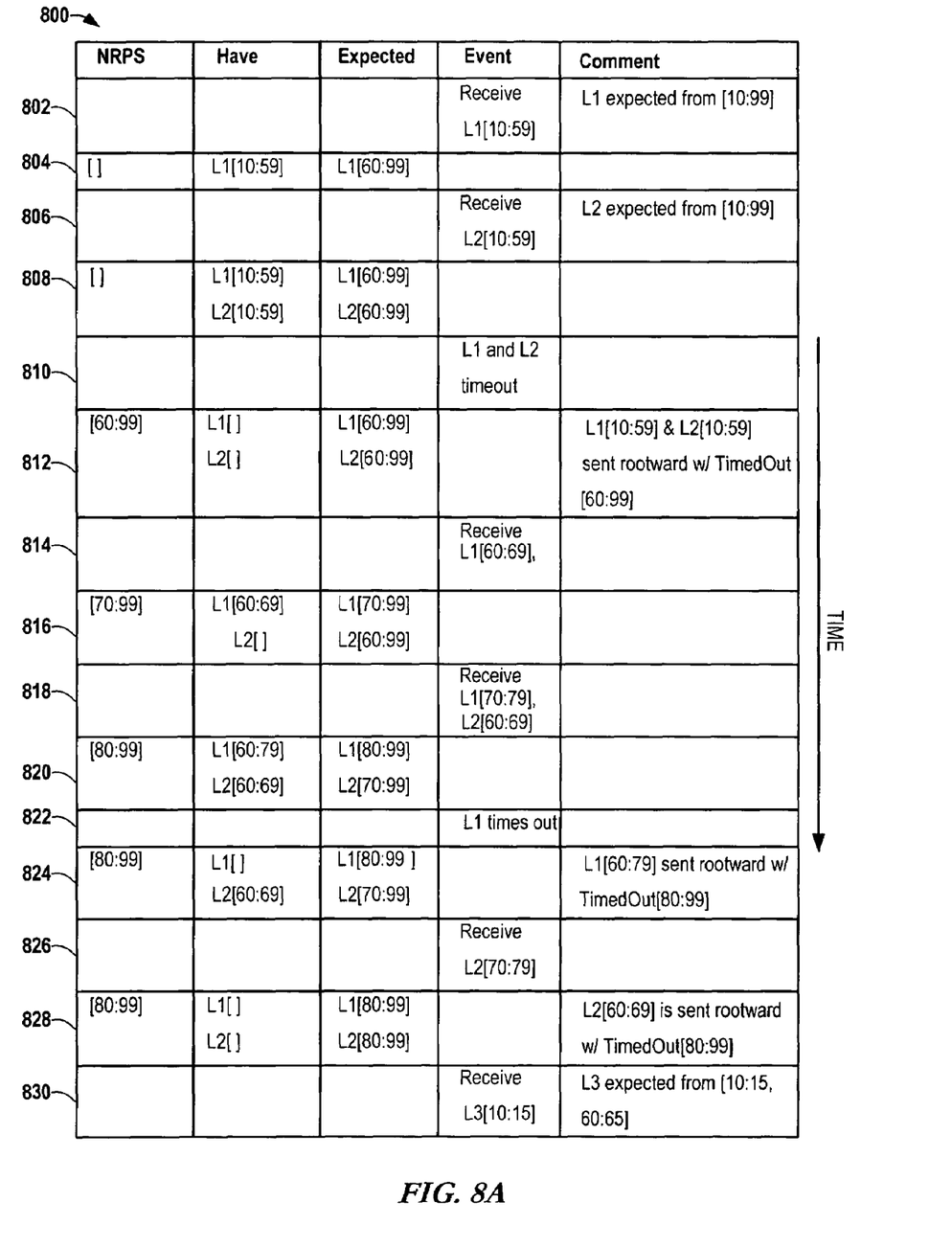
FIG. 8A illustrates an example of processing debug objects according to embodiments of the present invention.
Figure 8B:
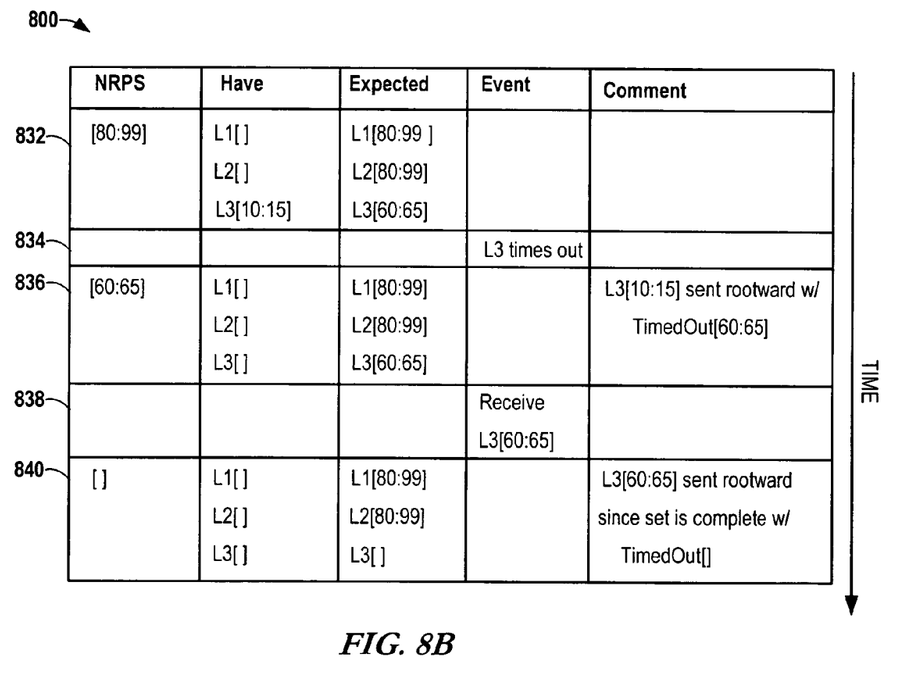
FIG. 8B illustrates an example continued from FIG. 8A of processing debug objects according to embodiments of the present invention.

To illustrate the processing algorithms, FIGS. 8A and 8B show an example of processing debug objects according to embodiments of the present invention. This example is illustrated in tabular form 800, with increasing time as the table is traversed downwards. For convenience, it will be assumed that each row of the table 800 represents a discrete point in time period, although it will be appreciated that some events may occur in parallel (e.g., using non-atomic functions or multi-processor system) or occur over a period of time. The first three columns of the table 800 represent the state of the process sets, specifically the NPRS, the "have" process set, and the "expected" processes set. The "Event" column shows data receipt and timeout events, and the "Comments" column describes other actions that occur in the aggregator node.

The inputs used in this example include three debug events, labeled L1, L2 and L3. L1 and L2 are associated with processes [10:99] and L3 is associated with processes [10:15, 60:65]. At time 802, objects L1[10:59] are received. This causes the "have" and "expected" sets to be updated appropriately at time 804. At time 806, a subset L2[10:59] is received, causing the "have" and "expected" sets to be updated as shown at time 808. At time 810, both L1 and L2 timeout. This results in the "have" process sets being sent root-ward, a timed out process set of [60:99] being sent root-ward, and NRPS being updated at time 812. Note that the process set actions at time 812 are in accordance with actions 702 and 704 in FIG. 7A.

At time 814, additional objects L1 [60:69] are received, resulting in the updates shown at time 816. A similar set of actions occur at times 818 and 820, this time with objects L1 [70:79] and L2[60:69]. At time 822, L1 times out again. As a result, at time 824, the "have" process set for L1 (L1[60:79]) is sent root-ward along with a timed-out process set based on the NRPS.

At time 826, L2[70:79] is received. Note that instead of waiting for L2 to timeout or for L2[80:99] to be received, L2[60:79] is sent root-ward at time 828. This is because the "expected" process set for L2 is a subset of NRPS (both are [80:99]). This corresponds to operations 602 and 606 in FIG. 6.

At time 830, object L3[10:15] is received, and the sets are updated as shown at time 832 in FIG. 8B. This assumes that the aggregator has already been informed prior to time 830 that the L3 event involved processes [10:15, 60:65]. At time 834, L3 times out, resulting in L3[10:15] and timed-out process set [60:65] being sent root-ward at time 836. At time 838, L3[60:65] is received. This completes the L3 object, which is then sent root-ward at time 840.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

It will be appreciated that processor-based instructions for implementing embodiments of the invention are capable of being distributed in the form of a computer readable medium of instructions and a variety of other forms. The description herein of such processor-based instructions apply equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-based method of managing, at a plurality of processing nodes communicatively coupled in a tree arrangement that converges at a root node, data received from a plurality of processes of a distributed computing arrangement, comprising:

in a first processing node of the plurality of processing nodes, receiving data objects from a first subset of the plurality of processes;

waiting for a waiting period to receive, from a second subset of the plurality of processes, one or more expected data objects in addition to the received data objects;

determining the second subset of processes to be non-responsive based on arrival times of the received data objects relative to a current time and expiration of the waiting period;

wherein determining the set of non-responsive processes includes, making a first comparison between a first timeout variable and the arrival time of a first object of the data objects relative to the current time,
making a second comparison between a second timeout variable and the arrival time of subsequent objects of the data objects relative to the current time, and
determining the set of non-responsive processes based on whether the greater of the first and second comparisons indicates a timeout condition has occurred;
aggregating the received data objects into a set of data objects without further waiting for data objects associated with the non-responsive processes;
sending the set of data objects and a reference to the non-responsive processes from the first node to a second processing node of the plurality of processing nodes, wherein the second processing node is nearer to the root node than is the first processing node; and
in the second processing node, aggregating the set of data objects received from the first processing node with data objects received from a third subset of the plurality of processes and sending the set of data objects to a third processing node that is nearer to the root node than is the second processing node without waiting for data objects associated with the non-responsive processes.

2. The method of claim 1, further comprising:
detecting a plurality of events targeted for the plurality of processes of the distributed computing arrangement; and
identifying the plurality of processes based on the events.

3. The method of claim 2, wherein each data object is associated with an event of the plurality of events.

4. The method of claim 3, wherein the data objects associated with each event form a set of groupable objects, wherein each set of groupable objects is aggregated separately from sets of groupable objects associated with other events.

5. The method of claim 1, further comprising, for a data object received by the first processing node from one of the second subset of processes after the aggregating and sending of the set of data objects and the reference, removing identification of the one of the second subset of processes from the reference to non-responsive processes to create an updated reference, and sending the updated reference to the second processing node.

6. A system comprising:
a distributed data-processing arrangement coupled to a network and having a plurality of processes;
a plurality of aggregator arrangements coupled to the network and being communicatively coupled in a tree arrangement that converges at a root node, each aggregator arrangement comprising:
a processor and a memory coupled to the processor and containing instructions causing the processor to
receive data objects from a first subset of the plurality of processes, wherein the data objects are output by the first subset of processes in response to an event;
wait for a waiting period to receive, from a second subset of the plurality of processes, one or more expected data objects in addition to the received data objects;
determine the second subset of processes to be non-responsive based on arrival times of the received data objects relative to a current time and expiration of the waiting period;
wherein the instructions cause the processor to determine the set of non-responsive processes by,
making a first comparison between a first timeout variable and the arrival time of a first object of the data objects relative to the current time,
making a second comparison between a second timeout variable and the arrival time of subsequent objects of the data objects relative to the current time, and
determining the set of non-responsive processes based on whether the greater of the first and second comparisons indicates a timeout condition has occurred;
aggregate the received data objects into a set of data objects without further waiting for data objects associated with the non-responsive processes;
send the set of data objects and a reference to the non-responsive processes to a first one aggregator arrangement of the plurality of aggregator arrangements that is nearer to the root in the tree than the sending aggregator arrangement, wherein the first aggregator arrangement aggregates the set of data objects with data objects received from a third subset of the plurality of processes into a new set of data objects and sends the new set of data objects to a second aggregator arrangement that is nearer to the root node than is the first aggregator arrangement without waiting for data objects associated with the non-responsive processes.

7. The system of claim 6, wherein the instructions further cause the processor to:
detect a plurality of events targeted for the plurality of processes of the distributed computing arrangement; and
identify the plurality of processes based on the events.

8. The system of claim 7, wherein each data object is associated with an event of the plurality of events.

9. The system of claim 8, wherein the data objects associated with each event form a set of groupable objects, wherein each set of groupable objects is aggregated separately from sets of groupable objects associated with other events.

10. A computer readable medium, comprising:
a program storage device configured with instructions for causing a processor of a data processing arrangement to perform the operations of,
communicatively coupling a plurality processing nodes in a tree arrangement that converges at a root node;
receiving data objects from a first subset of a plurality of processes of a distributed computing arrangement at a first one of the processing nodes;
waiting for a waiting period to receive, from a second subset of the plurality of processes, one or more expected data objects in addition to the received data objects;
determining the second subset of processes to be non-responsive based on arrival times of the data objects relative to a current time and expiration of the waiting period;
wherein determining the set of non-responsive processes includes,
making a first comparison between a first timeout variable and the arrival time of a first object of the data objects relative to the current time,
making a second comparison between a second timeout variable and the arrival time of subsequent objects of the data objects relative to the current time, and
determining the set of non-responsive processes based on whether the greater of the first and second comparisons indicates a timeout condition has occurred;
aggregating the received data objects into a set of data objects without further waiting for data objects associated with the non-responsive processes;
sending the set of data objects and a reference to the non-responsive processes from the first processing node to a second one of the processing nodes that is nearer to the root in the tree than the first processing node, wherein the second processing node aggregates the set of data objects with data objects received from a third subset of the plurality of processes into a new set of data objects and sends the new set of data objects to a third processing node that is nearer to the root node than is the second processing node without waiting for data objects associated with the non-responsive processes.

11. The computer readable medium of claim 10, wherein the operations further comprise:
   detecting a plurality of events targeted for the plurality of processes of the distributed computing arrangement; and
   identifying the plurality of processes based on the events.

12. The computer readable medium of claim 11, wherein each data object is associated with an event of the plurality of events.

13. The computer readable medium of claim 12, wherein the data objects associated with each event form a set of groupable objects, wherein each set of groupable objects is aggregated separately from sets of groupable objects associated with other events.

14. An apparatus for managing, at a plurality of processing nodes communicatively coupled in a tree arrangement that converges at a root node, data received from a plurality of processes of a distributed computing arrangement, comprising:
   means for receiving data objects from a first subset of the plurality of processes;
   means for waiting for a waiting period to receive, from a second subset of the plurality of processes, one or more expected data objects in addition to the received data objects;
   means for determining the second subset of processes to be non-responsive based on arrival times of the data objects relative to a current time and expiration of the waiting period;
   wherein the means for determining the set of non-responsive processes,
      makes a first comparison between a first timeout variable and the arrival time of a first object of the data objects relative to the current time,
      makes a second comparison between a second timeout variable and the arrival time of subsequent objects of the data objects relative to the current time,
      and
      determines the set of non-responsive processes based on whether the greater of the first and second comparisons indicates a timeout condition has occurred;
   means for grouping the received data objects into a set of data objects without further waiting for data objects associated with the non-responsive processes;
   means for sending the set of data objects and a reference to the non-responsive processes from the first node to a second processing node, wherein the second processing node is nearer to the root node than is the first processing node, and the second processing node groups the set of data objects received from the first processing node with data objects received from a third subset of the plurality of processes and sends the set of data objects to a third processing node that is nearer to the root node than is the second processing node without waiting for data objects associated with the non-responsive processes.

15. The apparatus of claim 14, further comprising:
   means for detecting a plurality of events targeted for the plurality of processes of the distributed computing arrangement; and
   means for identifying the plurality of processes based on the events.

* * * * *

UNITED STATES PATENT AND TRADEMARK OFFICE
CERTIFICATE OF CORRECTION

PATENT NO. : 7,469,268 B2
APPLICATION NO. : 10/910679
DATED : December 23, 2008
INVENTOR(S) : Susanne M. Balle et al.

Page 1 of 1

It is certified that error appears in the above-identified patent and that said Letters Patent is hereby corrected as shown below:

In column 12, line 38, in Claim 10, after "plurality" insert -- of --.

Signed and Sealed this

Fourth Day of August, 2009

JOHN DOLL
*Acting Director of the United States Patent and Trademark Office*